(12) United States Patent
Bennett et al.

(10) Patent No.: US 8,762,280 B1
(45) Date of Patent: Jun. 24, 2014

(54) METHOD AND SYSTEM FOR USING A NETWORK ANALYSIS SYSTEM TO VERIFY CONTENT ON A WEBSITE

(75) Inventors: Victor Bennett, Los Altos, CA (US); Shrish Agrawal, Bangalore (IN); Niels Provos, Mountain View, CA (US); Jayesh Sharma, San Francisco, CA (US); Kourosh Gharachorloo, Menlo Park, CA (US); Gokul Rajaram, Los Altos, CA (US)

(73) Assignee: Google Inc., Mountain View, CA (US)

( * ) Notice: Subject to any disclaimer, the term of this patent is extended or adjusted under 35 U.S.C. 154(b) by 381 days.

(21) Appl. No.: 12/917,190

(22) Filed: Nov. 1, 2010

Related U.S. Application Data

(63) Continuation of application No. 11/001,568, filed on Dec. 2, 2004, now abandoned.

(51) Int. Cl.
*G06F 21/00* (2013.01)

(52) U.S. Cl.
USPC ........ 705/51; 705/59; 726/1; 726/26; 726/27; 726/28; 726/29; 726/30

(58) Field of Classification Search
USPC .............................. 705/51, 59; 726/1, 26–30
See application file for complete search history.

(56) References Cited

U.S. PATENT DOCUMENTS

| | | | |
|---|---|---|---|
| 5,636,346 A | 6/1997 | Saxe | |
| 5,724,521 A | 3/1998 | Dedrick | |
| 5,740,549 A | 4/1998 | Reilly et al. | |
| 5,845,265 A | 12/1998 | Woolston | |
| 5,848,397 A | 12/1998 | Marsh et al. | |
| 5,870,559 A | 2/1999 | Leshem et al. | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,948,061 A | 9/1999 | Merriman et al. | |
| 5,974,398 A | 10/1999 | Hanson et al. | |
| 6,026,368 A | 2/2000 | Brown et al. | |
| 6,044,375 A | 3/2000 | Shmueli et al. | |
| 6,044,376 A | 3/2000 | Kurtzman | |
| 6,061,659 A | 5/2000 | Murray | |
| 6,067,570 A | 5/2000 | Kreynin et al. | |
| 6,078,866 A | 6/2000 | Buck et al. | |

(Continued)

FOREIGN PATENT DOCUMENTS

| | | |
|---|---|---|
| EP | 1026610 A3 | 1/2003 |
| WO | WO9721183 A1 | 6/1997 |
| WO | WO0038074 A1 | 6/2000 |
| WO | WO2004042525 A3 | 4/2005 |

OTHER PUBLICATIONS

U.S. Appl. No. 95/001,073, Reexamination of Stone et al.
U.S. Appl. No. 95/001,061, Reexamination of Stone et al.

(Continued)

*Primary Examiner* — Tsan-Yu J Huang
(74) *Attorney, Agent, or Firm* — Fish & Richardson P.C.

(57) ABSTRACT

A system and method for verifying content on a network site is provided. A document such as a website is identified. The document is accessed over a network from a content provider system connected to the network to obtain information about the document. Through an automated process, using the information about the document to determine whether the document conforms to one or more predetermined rules associated with the content provider system governing the usage of content in the document.

21 Claims, 6 Drawing Sheets

(56) References Cited

U.S. PATENT DOCUMENTS

| | | | |
|---|---|---|---|
| 6,078,914 A | 6/2000 | Redfern | |
| 6,144,944 A | 11/2000 | Kurtzman et al. | |
| 6,167,382 A | 12/2000 | Sparks et al. | |
| 6,199,081 B1* | 3/2001 | Meyerzon et al. | 715/210 |
| 6,223,163 B1 | 4/2001 | Van Luchene | |
| 6,230,170 B1 | 5/2001 | Zellweger et al. | |
| 6,247,009 B1 | 6/2001 | Shiiyama et al. | |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,298,348 B1 | 10/2001 | Eldering | |
| 6,324,519 B1 | 11/2001 | Eldering | |
| 6,336,132 B2 | 1/2002 | Appleman et al. | |
| 6,401,075 B1 | 6/2002 | Mason et al. | |
| 6,421,675 B1 | 7/2002 | Ryan et al. | |
| 6,701,350 B1 | 3/2004 | Mitchell | |
| 6,976,070 B1 | 12/2005 | Hoashi et al. | |
| 6,985,882 B1 | 1/2006 | Del Sesto | |
| 7,039,599 B2 | 5/2006 | Merriman et al. | |
| 7,136,875 B2 | 11/2006 | Anderson et al. | |
| 7,305,610 B1 | 12/2007 | Dean et al. | |
| 7,308,648 B1 | 12/2007 | Buchthal et al. | |
| 7,451,391 B1 | 11/2008 | Coleman et al. | |
| 2001/0042064 A1 | 11/2001 | Davis et al. | |
| 2001/0047272 A1 | 11/2001 | Frietas et al. | |
| 2001/0047297 A1 | 11/2001 | Wen | |
| 2001/0051911 A1 | 12/2001 | Marks et al. | |
| 2002/0002509 A1 | 1/2002 | Wagorn et al. | |
| 2002/0002525 A1 | 1/2002 | Arai et al. | |
| 2002/0026359 A1 | 2/2002 | Long et al. | |
| 2002/0035536 A1 | 3/2002 | Gellman | |
| 2002/0038282 A1 | 3/2002 | Montgomery | |
| 2002/0046099 A1 | 4/2002 | Frengut et al. | |
| 2002/0046104 A1 | 4/2002 | Kaddeche et al. | |
| 2002/0077891 A1 | 6/2002 | Castle et al. | |
| 2002/0099605 A1 | 7/2002 | Weitzman et al. | |
| 2002/0111898 A1 | 8/2002 | Numaoka et al. | |
| 2002/0120505 A1 | 8/2002 | Henkin et al. | |
| 2002/0123988 A1 | 9/2002 | Dean et al. | |
| 2002/0165773 A1 | 11/2002 | Natsuno et al. | |
| 2002/0184097 A1 | 12/2002 | Hijiri et al. | |
| 2002/0194062 A1 | 12/2002 | Linde | |
| 2002/0198780 A1 | 12/2002 | Kawakami et al. | |
| 2003/0037334 A1 | 2/2003 | Khoo et al. | |
| 2003/0070167 A1 | 4/2003 | Holtz et al. | |
| 2003/0083937 A1 | 5/2003 | Hasegawa et al. | |
| 2003/0149618 A1 | 8/2003 | Sender et al. | |
| 2003/0163372 A1 | 8/2003 | Kolsy | |
| 2003/0172050 A1* | 9/2003 | Decime et al. | 707/1 |
| 2003/0196104 A1 | 10/2003 | Baber et al. | |
| 2003/0216963 A1 | 11/2003 | Ishiwaka et al. | |
| 2004/0015397 A1 | 1/2004 | Barry et al. | |
| 2004/0019523 A1 | 1/2004 | Barry et al. | |
| 2004/0044571 A1 | 3/2004 | Bronnimann et al. | |
| 2004/0054577 A1 | 3/2004 | Inoue et al. | |
| 2004/0054589 A1 | 3/2004 | Nicholas et al. | |
| 2004/0059708 A1 | 3/2004 | Dean et al. | |
| 2004/0059712 A1 | 3/2004 | Dean et al. | |
| 2004/0093327 A1 | 5/2004 | Anderson et al. | |
| 2004/0093620 A1 | 5/2004 | Iino et al. | |
| 2004/0119740 A1 | 6/2004 | Chang et al. | |
| 2004/0143499 A1 | 7/2004 | Dietsch et al. | |
| 2004/0143843 A1 | 7/2004 | Khoo et al. | |
| 2004/0167928 A1 | 8/2004 | Anderson et al. | |
| 2004/0172389 A1* | 9/2004 | Galai et al. | 707/3 |
| 2004/0249709 A1 | 12/2004 | Donovan et al. | |
| 2005/0065806 A1 | 3/2005 | Harik | |
| 2005/0071224 A1 | 3/2005 | Fikes et al. | |
| 2005/0096979 A1 | 5/2005 | Koningstein | |
| 2005/0114666 A1 | 5/2005 | Sudia | |
| 2005/0131758 A1 | 6/2005 | Desikan et al. | |
| 2005/0131762 A1 | 6/2005 | Bharat et al. | |
| 2005/0144069 A1 | 6/2005 | Wiseman et al. | |
| 2005/0177844 A1* | 8/2005 | Levi et al. | 725/30 |
| 2005/0187818 A1 | 8/2005 | Zito et al. | |
| 2005/0216335 A1 | 9/2005 | Fikes et al. | |
| 2005/0222900 A1 | 10/2005 | Fuloria et al. | |
| 2005/0222903 A1 | 10/2005 | Buchheit et al. | |
| 2005/0222989 A1 | 10/2005 | Haveliwala et al. | |
| 2005/0223002 A1 | 10/2005 | Agarwal et al. | |
| 2009/0113287 A1 | 4/2009 | Yee | |

OTHER PUBLICATIONS

U.S. Appl. No. 95/001,069, Reexamination of Dean et al.
U.S. Appl. No. 95/001,068, Reexamination of Stone et al.
Chris Sherman, "Google Launches AdWords Select," Feb. 20, 2002, 6 pages.
Google Toolbar Revision History, www.google.com.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., "Advertising on the Internet," 2nd Ed., John Wiley & Sons, 1999.
Dedrick, R., "Interactive Electronic Advertising," IEEE, 1994.
Dedrick, R., "A Consumption Model for Targeted Electronic Advertising," Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Google Introduces New Pricing for Popular Self-Service Online Advertising Program, http://www.google.com/press/pressrel/select.html, p. 1-2, printed on Jul. 29, 2003.
Collection of papers from www.overture.com, printed on Jul. 29, 2003.
Collection of papers from findwhat.com, http://www.findwhat.com/index.asp, printed on Jul. 29, 2003.
Collection of papers from Sprinks.com, http://www.sprinks.com, printed on Jul. 29, 2003.
Collection of papers from Kandoodle.com, http://www.kanoodle.com, printed on Jul. 29, 2003.
Collection of papers from Google Advertising, http://www.google.com, printed on Jul. 29, 2003.

* cited by examiner

METHOD AND SYSTEM FOR USING A NETWORK ANALYSIS SYSTEM TO VERIFY CONTENT ON A WEBSITE

CROSS-REFERENCE TO RELATED APPLICATIONS

This application is a continuation of U.S. application Ser. No. 11/001,568, filed on Dec. 2, 2004, the disclosure of which is expressly incorporated herein by reference in its entirety.

FIELD OF THE INVENTION

The present inventions relate to automatically verifying over the Internet a client's use of a document such as a website.

BACKGROUND OF THE INVENTION

Internet content providers can earn revenue by publishing ads on their website. When an advertisement is selected by a user browsing the website, the user's browser issues an http request for the linked ad document. Data embedded in the user's http request identifies the referrer of the ad URL, i.e., the content provider site publishing the ad. The publisher may earn revenue when users click the ads published on their site. For instance, if a user surfing the www.cnn.com website selects an ad for a new car, the user's browser might request the linked new car document from a server, and the ad server might determine that the ad request was referred by www.cnn.com.

Some advertisers do not want their ads to be displayed on sites with offensive content, such as sexually explicit sites. Thus, before publishing ads, sites typically must first obtain approval from the owner of the ad content. Owners such as ad licensors sometimes inspect the content provided at the domain before granting a license or other permission.

Enforcing licenses and verifying referrer fields can be difficult and costly. First, it is very difficult to determine whether a potential ad publisher actually has control over an asserted domain. Publicly available information about site ownership is basically limited to "whois" data available from Network Solutions™ and other registrars (e.g., the website www-.whois.sc), which can be highly unreliable. For instance, the owner of a domain is frequently listed as "John Doe" with an address of "123 Test Street." Thus, when an entity requests to publish content on a specific website, it is difficult or impossible for the content licensor to verify whether the entity actually has control over that website or whether the entity has instead made a fraudulent request. Second, it is difficult to verify that users of licensed web content such as ads are using the content in accordance with the license or other policies.

Furthermore, because refer fields are self-reported, they are unreliable. The refer field of an http request is sometimes modified (e.g., due to a proxy dropping a refer field, other error, or malfeasance) to appear as though a user's clicks were originating from a page that does not actually publish the ads. The refer field of an ad request may falsely identify a website that did not actually publish the ad. This falsehood is difficult to detect without actually visiting the identified referrer website to verify publication of the ad. Because of the large number of sites and their frequently changing content, manually verifying that potential and current ad publishers consistently conform to specific compliance criteria would involve significant administrative and labor costs.

These and other drawbacks exist with current systems and methods.

SUMMARY OF THE INVENTION

Accordingly, various embodiments of the present inventions may be directed to a system and a method for verifying content associated with a document. A document such as a website is identified. The document is accessed over a network from a content provider system connected to the network to obtain information about the document. Through an automated process, using the information about the document to determine whether the document conforms to one or more predetermined rules associated with the content provider system governing the usage of content in the document.

In another exemplary embodiment, a system for verifying content associated with a document is provided. A processor identifies a document. The network site may comprise one of a network site identified in a received document and a network site of a document publisher. A network access device such as an Internet browser accesses the document over the network from a content provider system connected to the network to obtain information about the document. A compliance engine uses the information about the document in an automated process to determine whether the document conforms to one or more predetermined rules associated with the content provider system governing the usage of content in the document.

In another exemplary embodiment, a system for verifying content associated with a document is provided. A database stores one or more predetermined rules associated with a content provider system governing the usage of content in a document. An output device passes code associated with a processor, an Internet browser, and a compliance engine to one or more user computers. The processor is configured to identify the document at the user computer. The Internet browser is configured to access the document over the network from the user computer to obtain information about the document. The compliance engine is configured to use the information about the document at the user computer in an automated process to determine whether the document conforms to the one or more predetermined rules associated with a content provider system governing the usage of content in the document. An input device receives results of a compliance engine determination at the one or more user computers.

In another exemplary embodiment, a method for verifying content associated with a document is provided. One or more rules and a network crawler are downloaded onto a user computer, wherein the network crawler is configured to identify a document, access the document over the network to obtain information about the document, and through an automated process, generate compliance information based on the information about the document. The compliance information comprises information about whether the document conforms to the one or more rules. The compliance information is received from the user computer.

In another exemplary embodiment, a method for verifying content on a network site is provided. A target website is identified, wherein the target website comprises at least one of a website identified in a referrer field of an http request and a website identified in an application to publish content provided by a content provider system. The target website is accessed over the network from an Internet crawler of the content provider system connected to the network. Content of the target website is reviewed, wherein the content comprises at least one of specific text or phrases, scripting language code that interacts with code related to publishing documents via the network site, code related to a document provided by the content provider system, and any modification to code provided for publishing on the target website by the content provider system. Through an automated process, a determination is made whether the content of the target website conforms to one or more predetermined rules associated with the content provider system governing the usage of content on the target website.

DETAILED DESCRIPTION OF EXEMPLARY EMBODIMENT(S)

Some embodiments of the present invention provide a network analysis system (e.g., a website crawler) to verify content in a document such as a website. In some embodiments, the network crawler may determine whether content provided on a network site conforms to compliance criteria or other predetermined guidelines. The network crawler (or other network analysis system) may target sites for review, review the sites according to predetermined criteria, and review additional sites linked to the target sites. For instance, the network crawler may automatically inspect websites to determine whether the websites display or use specific content, e.g., in accordance with terms of an agreement governing the use of the content. Accordingly, a large amount of content may be reviewed quickly and often.

It should be noted that the content may be in a website, email, text, image, advertisement, spreadsheet, audio file, video file, other data file, other electronic document, or other document. Although a network site such as a website may be used throughout this application for exemplary purposes, it should be understood that other documents such as text files are contemplated within the scope of this invention.

In some embodiments, one or more web crawlers (or other network analysis systems) are used to access and review network sites, such as websites. The web crawler(s) may target and review websites to determine whether the websites use content according to predetermined guidelines, such as standards of appropriateness and/or terms of a content license agreement or other agreement. The web crawler(s) may target one or more specific sites. For instance, the web crawler(s) may target domains that were identified in relation to a license agreement and/or domains that were identified in referrer fields of http requests for content. The web crawler(s) may comprise programs that operate from a user's computer, such as a user's web browser or toolbar, and/or from a central server.

Significant administrative and labor costs may be avoided by automatically inspecting sites instead of manually inspecting them. Further, many more sites may be reviewed, and a content publisher may be reviewed more often, such as in real time whenever a server receives an http request identifying the content publisher. Thus, various embodiments of the invention enable more effective and timely compliance determinations for network sites that use content according to predefined criteria. In addition, the automatic nature of such automatic inspection may reduce manual reviewing errors and ensure a consistency in the application of compliance rules across many sites and time frames.

Overview and System Architecture

Figure 1:
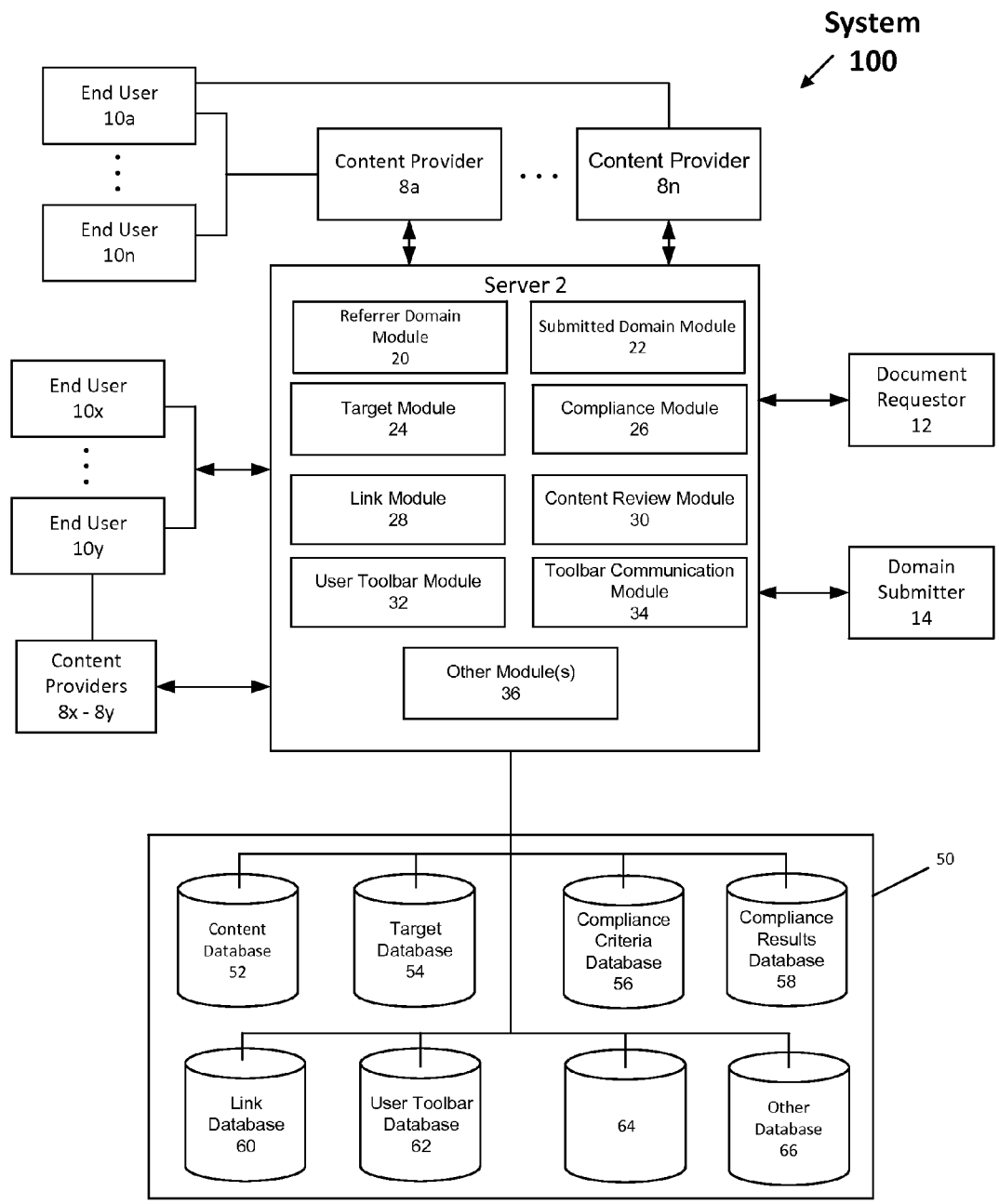
FIG. 1 depicts a system for verifying content associated with a document according to an embodiment of the invention.

FIG. 1 depicts a system 100 for automatically verifying content associated with a document. For instance, the system 100 may verifying that the content conforms to predetermined guidelines. The content may be content of a document such as a website, and it may comprise an advertisement, text document, image, or other document.

An advertisement may comprise audio and/or video signals, static and/or dynamic images, graphics, video, film, or other content that relate to one or more products, services, and/or entities, such as commercial entities. Ads may comprise various visual features, including animation, sound, etc., and may also include text, such as in a text advertisement. Ads may also comprise any other promotional content or object, such as printed flyers (e.g., with maps to locations of advertising businesses), printed coupons, trinkets, gimmicks, clothing (e.g., T-shirts printed with a promotional message), candy, food, samples (e.g., product samples), and other items. Thus, the term "advertisement" is used herein in its broadest sense to mean any content or object intended for observation, use, or consumption by one or more persons for the purpose of marketing or promoting a product or service.

While ads and websites are used for exemplary purposes, it should be understood that embodiments of the invention may be directed to other electronic documents and network sites. For instance, various embodiments of the invention contemplate documents such as content pages, search results, emails, applications, IM messages, audio content or files, video content or files (e.g., television programming), other files, other data or applications that may reside on one or several (e.g., a network) of computer systems, or other definable concepts or content.

The content to be verified by system 100 may comprise documents, code and/or any feature related to such content, such as its location (e.g. on the website), font, size, highlighting (e.g., italics or bold), and/or associated content (e.g., linked content, or content located next to, above, below, or otherwise near the content). For purposes of this invention, content may also include the absence of specific content, such as the absence of a document displayed on a particular website (e.g., the absence of a document indicated by a referrer field).

The system 100 may comprise one or more servers 2 coupled to one or more databases 50, one or more content providers 8a-8n, one or more end users 10a-10n, one or more document requestors 12, and one or more domain submitters. The content providers 8a-8n, document requestors 12, and domain submitters 14 may communicate with the server 2 and/or end users 10.

As used herein, server 2 and its associated databases and modules may be referred to herein as a content provider system, network analysis system, compliance engine. The server 2 may also be referred to herein as a crawler because in some embodiments the server 2 may operate to verify compliance and to "crawl" to different sites on a network. In addition, system elements that are comprised in the server 2 and its associated databases, such as target module 24, compliance module 26, link module 28, and content review module 30 may also be referred to herein as a compliance engine and/or a crawler.

End users 10a-10n may comprise persons who may receive documents or other content, by receiving a web page at a user computer. End users 10a-10n may also refer to the user's computer web browser 10, such as Internet Explorer™, which may communicate with content providers 8 and server 2.

Content provider 8 may comprise any server, document provider (e.g., a website publisher or other content provider), search engine, or other entity that publishes or makes available information, services, and/or products over an electronic network, such as the Internet. Content provider 8 may comprise one or more of the following, for example: an advertisement listings provider, an electronic document publisher or provider, a website host, a server 2, any other entity that provides electronic documents to users or other entities, or any other provider of content.

Document requestors 12 may comprise any server, web browser, document publisher, or other entity that may request documents, e.g., from server 2. For instance, document requestor 12 may request one or more ads from server 2. The document request may comprise an http referrer field, which may be identified by the server. For instance, if an end user 10 clicks on an advertisement displayed at www.cnn.com, the user's web browser may request the clicked advertisement from server 2, and the request may identify that the request originated from www.cnn.com.

Domain submitters 14 may comprise any entity that may submit a domain to the server, such as a document requestor. In some embodiments, domain submitters 14 may submit a domain in connection with a request to receive advertisements from server 2 and provide such advertisements to end users 10. The server 2 may inspect content at the submitted domain and determine whether to approve the domain for inclusion in the program.

The server 2 may comprise a computer, server, hub, central processor, or other entity in a network, or other processor. The server 2 may comprise a crawler and/or a compliance engine. For instance, the server 2 may comprise a bot that crawls the Internet and determines whether Internet websites conform to predetermined criteria. The server 2 may also comprise a content provider system. The server 2 may comprise input and output devices for communicating with other various system 100 elements, e.g., 6, 8, 10, 12, and 14.

In some embodiments, the server 2 may be comprised in an end user's computer 10, e.g., as a toolbar in a user's web browser.

The server 2 may comprise a plurality of modules, such as referrer domain module 20, submitted domain module 22, target module 24, compliance module 26, link module 28, content review module 30, user toolbar module 32, toolbar communication module 34, and other module(s) 36. Each module may comprise a processor as well as input and output devices for communicating with other modules, databases, and other system elements.

Referrer domain module 20 may identify a referrer domain of a request for a document, such as a request from document requestor 12.

Submitted domain module 22 may identify a domain submitted or otherwise identified to server 2 by another party, such as content provider 8. For instance, a domain may be submitted as a domain that may display advertisements provided by server 2. For instance, the owner (or purported owner) of a specific website may submit an application to publish server 2 content on a the website, and the application may identify the website. In some embodiments, an http request may be submitted to the server 2, wherein the http request identifies a referring network site in a referrer field of the request in addition to the requested http website.

Target module 24 may identify network sites such as domains to be reviewed by server 2. Such domains may include those identified by referrer domain module 20, submitted domain module 22, link module 28, and/or toolbar communication module 34. For instance, target module 24 may target documents such as home pages, emails, websites, or other network sites that are specifically identified by referrer domain module 20. Target module 28 may also identify sites that are identified by the link module 28 to be within five degrees of separation of those specifically identified sites.

Compliance module 26 may determine compliance criteria. The compliance criteria may comprise predetermined guidelines associated with content. For instance, compliance criteria may comprise rules (e.g., terms of a license agreement) related to the display of ads associated with server 2. Compliance criteria may comprise standards relating to any of the following: pornography, sexual content, adult-related content, curse words, violent content, alcohol or drug-related content, and other content (or lack thereof) that may be undesirable. Compliance criteria may be in the form of executable code or other instructions that may be carried out by a processor such as a compliance engine.

It should be appreciated that compliance module 26 may apply different standards to different types of documents or network sites. For instance, sites that are one degree of separation from a network site may be reviewed according to one set of criteria, while documents that are two or more degrees of separation from the originally linked document may be reviewed according to a different and more lax set of criteria. For instance, sexually explicit content may be impermissible in a document identified in a referrer field, but it may be tolerated in a document of a different domain that is more than two degrees of separation from the document identified in the referrer field.

Link module 28 may determine links associated with a targeted network site. For instance, if a network site such as www.google.com is targeted by target module 24, then link module 28 may access the site and identify any documents or other websites that are directly linked to the site. Link module 28 may also access and identify network sites that are indirectly linked to the originally targeted site.

For the sake of discussion, sites directly linked to an originally reviewed site may be considered to be one degree of separation away from the original network site because they are accessible directly from the original network site. Network sites and documents that are linked to directly linked network sites and documents may be considered two degrees away. Sites that are directly linked to those second degree sites may be considered to be three degrees away; and so on. Thus, a site that is five degrees away may be accessed from the original network site by clicking five links in succession.

Link module 28 may identify network sites for any number of degrees of separation. These sites that are within a specific number of degrees of separation may be targeted by target module 24 and reviewed by content review module 30. In some embodiments, link module 28 may access and identify only a subset of directly and/or indirectly linked sites. For instance, link module 28 may identify or access only those linked sites that are hosted by the domain of the originally targeted network site.

In some embodiments, link module 28 may access only those linked sites that are hosted by a domain otherwise identified by the target module 24. In other words, link module 28 may avoid accessing or identifying sites that are not directly associated with the domain (or domains) identified by target module 24. In these embodiments, link module 28 may significantly reduce the number of sites that may be accessed and identified, thereby decreasing its use of bandwidth and other Internet resources.

Content review module 30 may review content at targeted network sites. Content review module 30 may comprise a compliance engine. Content review module 30 may review text, images, code, and/or other content at a network site to determine whether it complies with compliance criteria. For instance, in some embodiments, content review module 30 may review any of the following content of a site: specific text or phrases; JavaScript (or other code) that interacts with code related to displaying documents on the web page; absence of code related to a document; and any modification to code provided to the document publisher by the content provider system.

Content review module 30 may also identify documents or other network sites associated with (e.g., linked to) the reviewed network site. Content review module 30 may also review linked sites identified by link module 28.

The content review module 30 may limit its review of linked sites according to specific criteria. For instance, content review module 30 may review only those linked sites that are hosted by the domain of the originally targeted network site and/or those linked sites that are hosted by a domain identified by the target module 24.

The content review module 30 may use image processing and other technologies to identify and review text, images, and other content, e.g., as describe in commonly owned U.S. application Ser. No. 10/812,417 entitled "System and Method for Rating Electronic Documents," filed Mar. 30, 2004, and in commonly owned U.S. application Ser. No. 10/841,834 entitled "System and Method for Rating Documents Comprising an Image," filed May 10, 2004, the disclosures of which are incorporated herein by reference in its entirety.

User toolbar module 32 may cause a compliance engine similar to that described for server 2 to exist on a user computer. The compliance engine may similarly comprise a network analysis system. The compliance engine may be associated with (e.g., downloaded in conjunction with) a toolbar on the user's computer, such as the Google™ toolbar which can be used in conjunction with a user's web browser. The web crawl may enable the user's computer to accomplish the functions described herein with respect to the server 2.

For instance, the user network analysis system/compliance engine may comprise a target module that identifies domains such as domain accessed by the user (or domains identified in content stored at the user's computer, or domains that communicate with the user's computer), a compliance module that determines and/or stores compliance criteria, a content review module that reviews the content at an identified domain, a link module that identifies additional sites associated with the domain, etc. The network analysis system may correspondingly comprise a database similar to database 50. The user network analysis system may store compliance result information at a compliance result database. Alternately or in addition, it may pass such results to a central processor such as server 2. The server 2 may update the user compliance engine with new targeting code and/or new compliance criteria.

Toolbar communication module 34 may communicate with user network analysis systems and receive network analysis system data (e.g., data about various websites gathered by a website crawler). For instance, toolbar communication module 34 may receive compliance information for various domains inspected by the user network analysis systems. Toolbar communication module 34 may also pass information to the user network analysis systems, e.g., to update them with new compliance criteria or to change the operation of the network analysis system.

Other module 36 may have other functions.

A database 50 may be coupled to the server 2. The database 50 may comprise a plurality of databases as described below, such as content database 52, target database 54, compliance criteria database 56, compliance results database 58, link database 60, user toolbar database 62, and other database 64.

A content database 52 may store documents such as advertisements or other documents that may be provided to content providers 8, users 10, and document requestors 12. For instance, a user 10 may click on a hypertext link on a web page that causes the user's web browser to request a document from the server 2. The server 2 may then provide the document to the user 10.

Target database 54 may store information identifying websites that may be reviewed, such as the website's URL. These websites may include domains submitted by domain submitters 14 as well as domains that appear in referrer fields of http requests from users 10 and content providers 8. These websites may also include any other network site identified by (or submitted by or otherwise associated with) domain submitters 14, content providers 8, and users 10 (e.g., via a user's crawler). Target database 54 may also store information about network sites identified by link module 30.

Compliance criteria database 56 may store compliance criteria and other information applicable to the review of a website. Compliance criteria may be communicated to (and from) compliance module 26. Content review module 30 may review a network site based on the compliance criteria.

Compliance results database 58 may store information associated with the results of a review of a network site, e.g., by content review module 30. A compliance result may comprise a result or other information relating to whether a specific network site satisfies a particular compliance criterion (and/or the degree to which it has a particular compliance feature, such as the degree to which it contains sexually explicit content). For instance, a compliance result may comprise any of the following: a positive (or negative) determination that a network site contains content in violation of an agreement, policy, or other guideline; a determination that a network site contains a mild degree (or other degree) of violent, sexually explicit, or otherwise inappropriate content; a determination that a network site identified in a refer field of a particular http request does not actually display a document that would give rise to the http request; a determination that an attribute in a user's click refers to a website that was (or was not) authorized to publish a document associated with the user's click; a determination that a network site otherwise fails to publish or otherwise provide a specific document or code; a determination that a network site publishes (or does not publish) offense language; a determination that a network site does (or does not) use a document or code in accordance with the terms of an agreement; a determination that a network site has (or has not) modified a document or code; a determination that a document is (or is not) published in a particular manner (e.g., a particular location on a page, a particular size, etc.); and other results.

Link database 60 may store information associated with one or more documents linked to a reviewed network site. The linked network sites may be identified by link module 30. For instance, link database 60 may store URLs of links embedded in a reviewed document.

User toolbar database 62 may store information associated with crawlers at user computers 10. For instance, toolbar database 62 may store information that may be passed to or received from user computers 10, such as crawler updates for user crawlers or compliance determinations by user crawlers.

Other database 64 may store other information.

Illustrative System Environment

Figure 2:
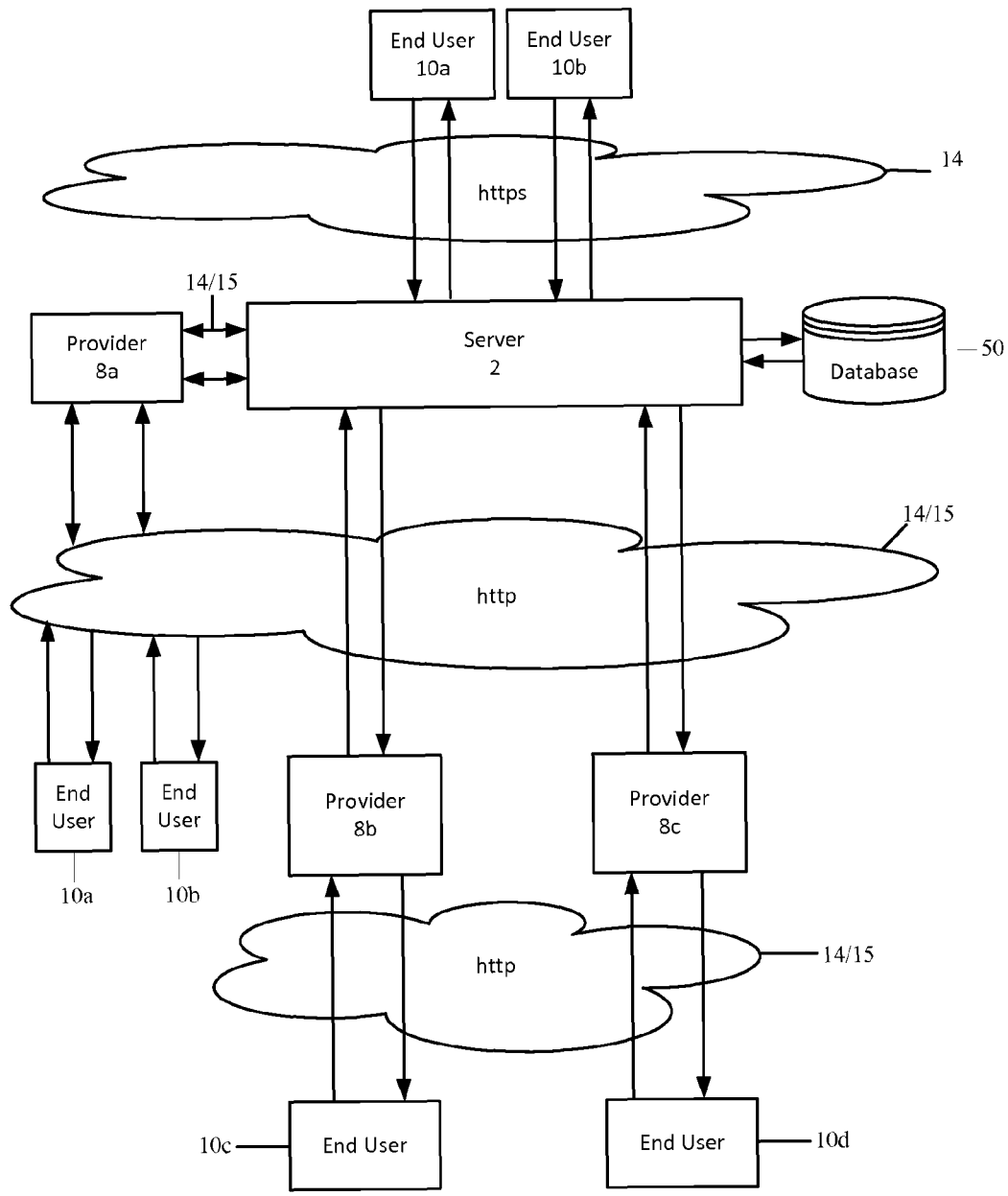
FIG. 2 depict an exemplary system environment according to various embodiments of the invention.

FIG. 2 depicts exemplary system 100 environments according to various embodiments of the invention. In these systems, only the server 2, provider 8, and database 50 are shown. The other components may be linked to these components as shown in FIG. 1 via a network, e.g., a wireless network or the Internet. The system elements may communicate over http networks 14 and secure https networks 15, as well as other networks.

End users 10 may request and receive documents from providers 8 and server 2. The server 2 may provide documents such as advertisements to providers 8 and users 10.

In some embodiments, user computers 10 may comprise a verification crawler in accordance with the invention. User computers may obtain compliance criteria from server 2, access network sites of providers 8, determine whether the content of the network sites complies with various compliance criteria stored at the user computer 10 (or at server 2), and pass compliance information to server 2.

Further information about system 100 environments may be found in the U.S. Applications incorporated herein, above.

Illustrative Verification Process

Figure 3:
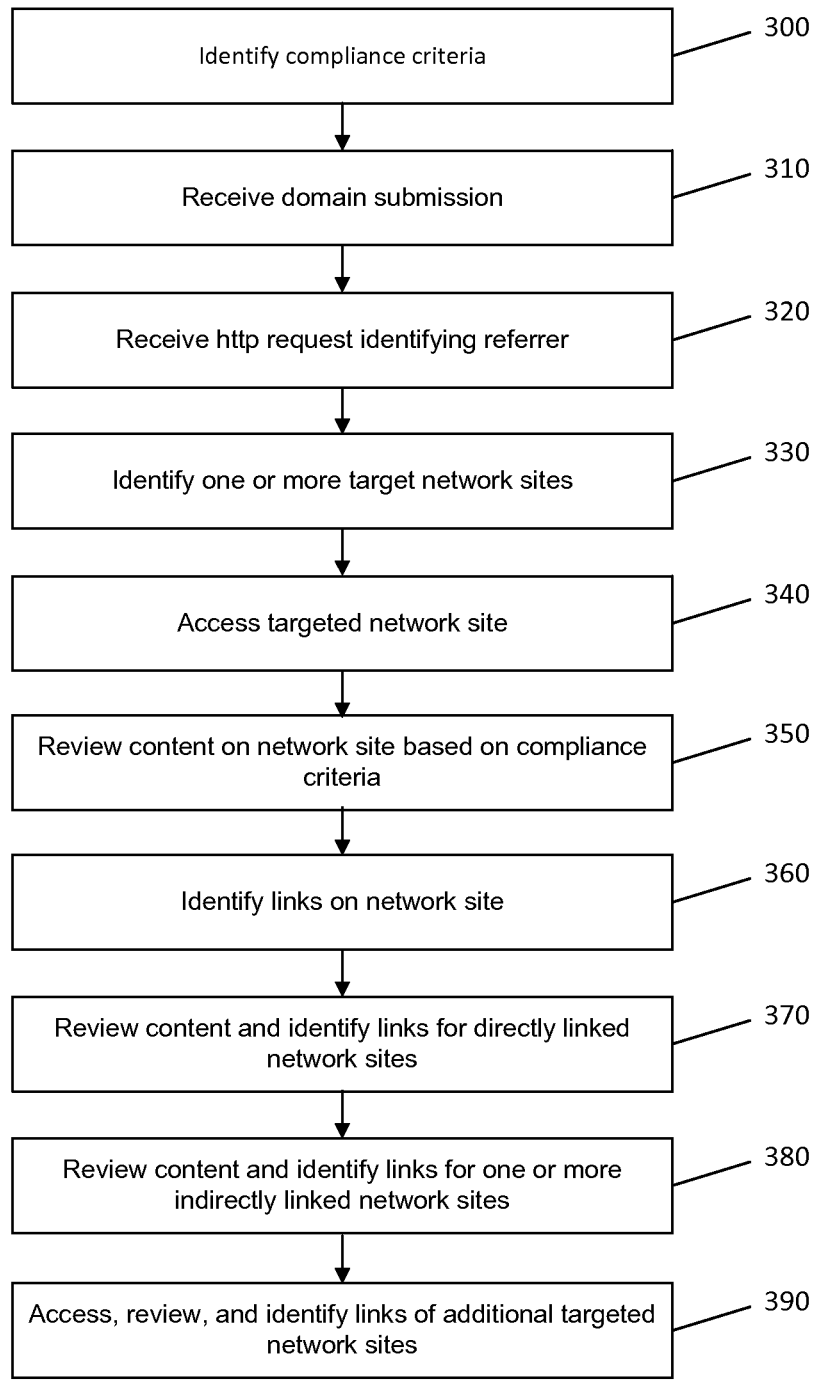
FIG. 3 illustrates a flow chart showing a method for verifying content associated with a document according to an embodiment of the invention.

FIG. 3 is a flow chart illustrating an exemplary method for verifying content associated with a document. In block 300, compliance criteria is identified, e.g., by compliance module 26.

In block 310, one or more domain submissions are received. For instance, an entity may apply to participate in an advertisement publishing program, wherein accepted applicants may publish ads and earn revenue when users click on the ads. The entity may submit a domain name where the ads would be published, such as www.cnn.com. The entity may also assert the right to control the content on www.cnn.com.

In block 320, an http request identifying a referrer is received. For instance, a user or content provider may submit a request an advertisement document, and the request may identify the referrer site, i.e., the site where a link to the advertisement document was published. For instance, the http request may identify www.espn.com as the referrer site.

In block 330, one or more target network sites (or documents) are identified. For instance, the target module 24 may identify submitted domains and referrer domains.

In some embodiments, a processor on a user's computer may identify target sites, such as sites accessed by the user on the user's web browser. The processor may also target network sites that are associated with the user's computer, such as network sites that are identified in emails and other documents stored on the user's computer, and/or sites that are identified (e.g., as hypertext links) in web pages viewed by the user.

In block 340, a targeted network site is accessed. In this action, the content of a target network site may be downloaded. For instance, a web browser (e.g., of a web crawler or other network analysis system) may visit the site www.cnn.com.

In block 350, content on the targeted network site is reviewed based on the compliance criteria. The text, images, pop-ups, java script, other code, or other content of the network site may be reviewed, e.g., by content review module 26. The content may be reviewed according to the compliance criteria.

For instance, if www.espn.com was identified in a referrer field for a particular ad request, then www.espn.com may be reviewed to determine whether the particular ad (or code associated with the ad) is actually displayed (or enabled) at the site. The site may also be reviewed to determine whether it contains undesirable or prohibited content.

For instance, text, images, and movies or other content displayed and/or encoded at the site may be reviewed to determine whether they contain inappropriate words, messages, or images, such as sexually explicit or violent images.

In another example, if www.cnn.com was identified as an applicant for an ad publishing program, the site's content may be reviewed to determine whether it contains any inappropriate content (e.g., violent or sexually explicit content).

In block 360, links on the targeted network site are identified. For instance, hypertext links embedded in the network site may be identified. At the site www.cnn.com, internal links at the cnn domain such as www.cnn.com/news and www.cnn.com/technology may be identified as well as links to external network sites such as www.beer.com and www.education.com.

In block 370, the acts of accessing content, reviewing content, and identifying links are repeated for one or more directly linked network sites and/or documents.

In block 380, the acts of accessing content, reviewing content, and identifying links are repeated for one or more indirectly linked network sites and/or documents. These network sites and documents may comprise network sites and documents that are two or more degrees of separation away from the targeted site.

In block 390, the acts of accessing content, reviewing content, and identifying links are repeated for one or more additional targeted network sites.

The actions of all or merely some of the blocks may be accomplished within the scope of this invention. The actions may be completed in any order, and they may overlap in time with other actions.

Figure 4:
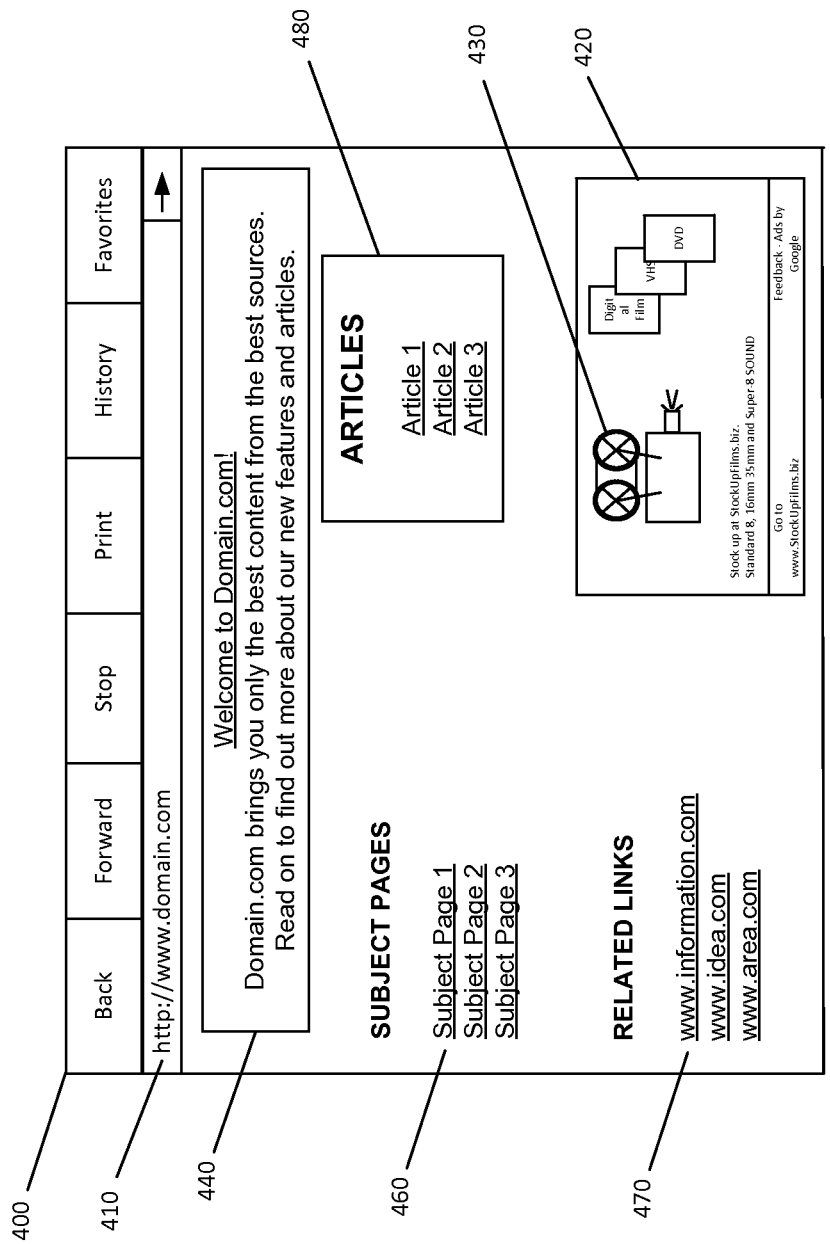
FIG. 4 illustrates an exemplary network site that may be reviewed according to an embodiment of the invention.

FIG. 4 illustrates an exemplary network site 400 that may be reviewed according to an embodiment of the invention. Here, the network site is displayed in a web browser. The network site may comprise a domain and/or http address 410, text 440, links 460, 470, 480 to other network sites, documents such as advertisements 420, and images 430 (which may be comprised in documents or elsewhere).

In some embodiments, server 2 may receive an http request for a specific advertisement 420, wherein the request identifies http://www.domain.com as the referrer. The request may effectively indicate that the site http://www.domain.com displayed the specific advertisement. In response, the server 2 may review the site http://www.domain.com to determine compliance results, such as by verifying that the advertisement 420 is indeed located on the site. As shown in FIG. 4, the advertisement 420 is indeed at the site http://www.domain.com, and so the server 2 may determine that the referrer is valid and that the domain is in compliance with the request. The text 440, images 430, and other content may also be reviewed for inappropriate content.

However, the compliance criteria may further specify that the advertisement should be displayed at the top left portion of the website. In this scenario, the crawler may determine that the site is not in compliance with this criterion because the advertisement is displayed in the bottom right.

The crawler may also identify various links 460, 470, 480 displayed or embedded in the network site, such as links 480 to other documents at the same domain (i.e., hosted by www.domain.com) and links 470 to other network sites not hosted by the same domain.

Figure 5:
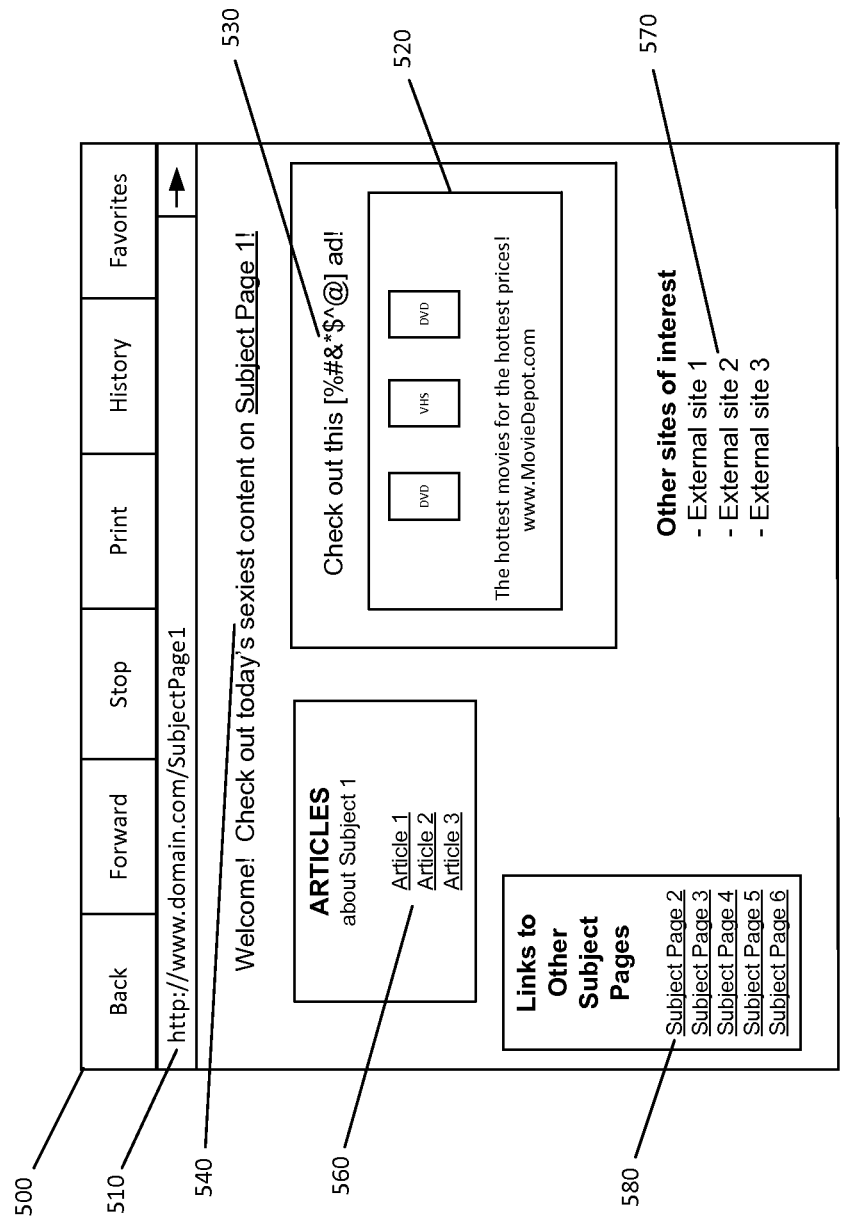
FIG. 5 illustrates another exemplary network site that may be reviewed according to an embodiment of the invention.

The crawler may then access and review one or more linked sites, such as those sites hosted at the same domain (e.g., www.domain.com/SubjectPage1 and www.domain.com/SubjectPage2). For instance, the crawler may access network site 500 (as shown in FIG. 5), e.g., by "clicking" or otherwise selecting the corresponding hypertext link embedded in site 400. Because site 500 is directly accessible from a link in site 400, network site 500 may accordingly be considered to be one degree of separation from network site 400.

FIG. 5 illustrates another exemplary network site 500 that may be reviewed according to an embodiment of the invention. The network site may be hosted by the same domain as another site, such as another targeted site (e.g., site 400). The site 500 may comprise a domain 510 (e.g., http://www.domain.com/SubjectPage1), text 540, internal links 560, 580 hosted at the same domain, external links 570 to other domains, documents such as advertisements 520, and inappropriate content 530 such as profane content.

In some embodiments of the invention, a server 2 (e.g., a web crawler or other network analysis system) may review the site 500 to determine whether its content complies with specific compliance criteria. The crawler may determine that the words "Check out this [%#&*$^@] ad" in 530 comprise prohibited content (e.g., based on a determination that the words comprise profanity). The crawler may also identify links 560-580 to other network sites that may be reviewed. These linked sites may accordingly be two degrees of separation from the original targeted site shown in FIG. 4 because they are directly linked from a site 500 that is directly linked from the original site 400.

The crawler (e.g., server 2) may also determine that the word "sexiest" in the text 540 is inappropriate and therefore fails a prohibition against sexually-related content. Also (or alternately), the crawler may determine that the word "sexiest" does not qualify as sexually explicit content. On the other hand, if network site 500 contained a picture of a woman wearing a bikini or other adult content, it may determine that the site contains impermissible sexually explicit content.

Figure 6:
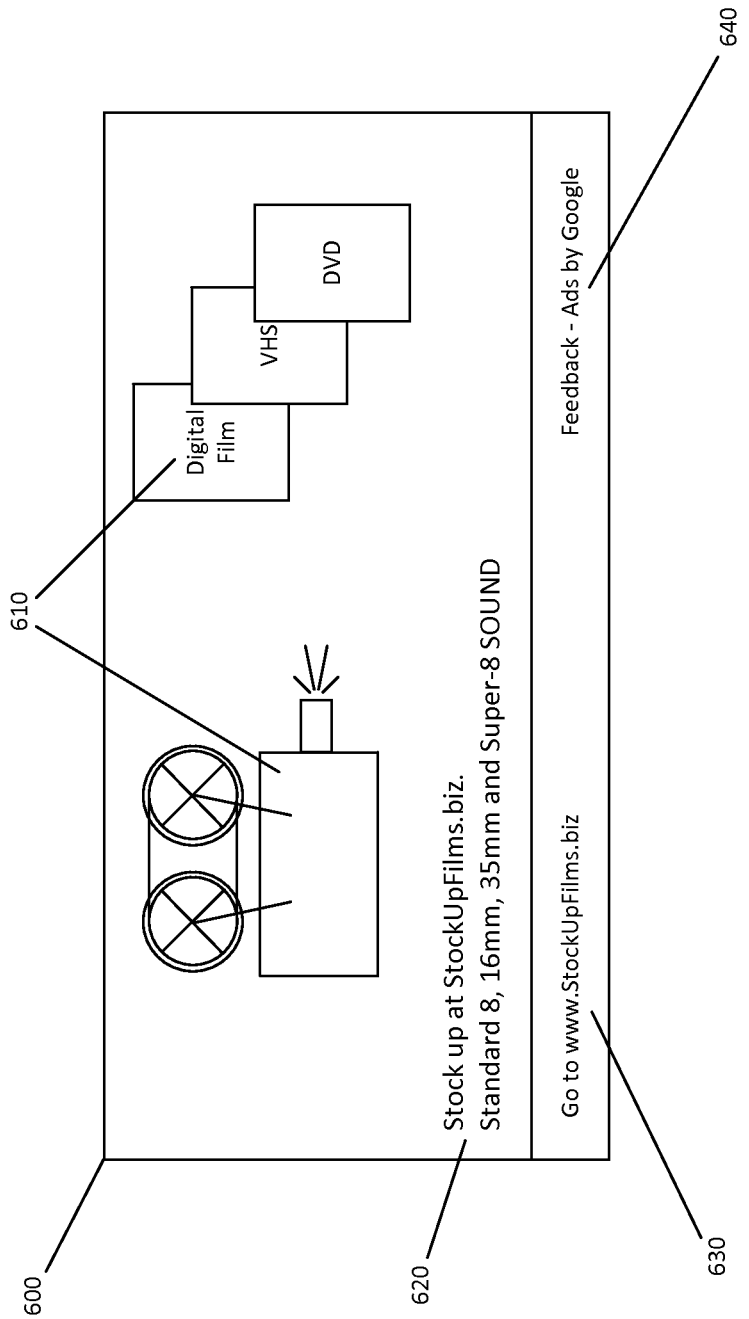
FIG. 6 depicts an exemplary document published on a network site that may be reviewed according to an embodiment of the invention.

FIG. 6 depicts an exemplary document 600 published on a network site that may be reviewed according to an embodiment of the invention. The document 600 may comprise images 610, text 620, one or more links 630, and one or more compliance features, such as a feedback link 640 that enables viewers to provide feedback about the ad.

The document 600 may be published on a network site, such as the sites shown in FIGS. 4 and 5. When a crawler accesses the network site, it may identify and review the document 600. The document may be reviewed based on compliance criteria, as described above. For instance, the ad may be reviewed to determine whether it contains inappropriate text or images. If the document 600 links to another document (e.g., via link 630), the linked document may be similarly reviewed.

In some embodiments, the document 600 may be an advertisement or other document whose publication is subject to criteria (such as terms of a license agreement). If the document was provided by the server 2 or an entity associated with the server 2, the document may be reviewed to determine whether its content and code is identical to that of the provided document. For instance, the document may be reviewed to determine whether it has been modified (e.g., whether its code has changed). If the ad 600 should have a feedback link 640, the crawler may determine whether the feedback link 640 is adequately displayed and in working order. The crawler may also verify that the ad is the correct size and shape and that the ad is displayed in the proper manner (position, font, color, pop-up status, etc.).

It should be understood that documents may be reviewed directly in a manner similar to that of network sites.

It should further be understood that the server, processors, and modules described herein may perform their various functions (e.g., reviewing content of a website) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to network sites identified by domain submitters and referrer fields, the principles herein are equally applicable to other any service that allows placement of its own code on others' network sites, such as search engines, banner ad networks, sites that license content feeds, e-commerce sites that license content, and hosting providers. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A method for verifying content associated with a first document, the method comprising:
    identifying, by one or more computers and in a first document, a first link to a first external network site that is different from a network site in which the first document is included;
    obtaining, by one or more computers, content of a second document that is stored at a network location referenced by the first link, the second document having a first degree of separation from the first document;
    obtaining, by one or more computers and in the second document, content of a third document that is referenced by a second link included in the second document, wherein the second link is to a second external network site that is different from the first external network site and the network site, the third document having a second degree of separation from the first document;
    determining whether to approve the first document based on the content of the second document and the content of the third document, the determination comprising:
        determining, based on the second document having the first degree of separation, whether the content of the second document is compliant content based on a first set of compliance rules; and
        determining, based on the third document having the degree of separation, whether the content of the third document is compliant content based on a second set of compliance rules that are different from the first set of compliance rules; and
    transmitting a signal specifying whether the first document is approved based on the determining.

2. The method of claim 1, wherein the first and the second document comprise at least one of a network site identified in a received document or a network site of a document publisher.

3. The method of claim 2, wherein identifying the first link comprises identifying a domain that was submitted by the document publisher.

4. The method of claim 3, further comprising transmitting one or more documents to the document publisher for delivery to users who access a website associated with the document publisher.

5. The method of claim 2, wherein identifying the first link comprises identifying a domain that appeared in a referrer field of a http request.

6. The method of claim 1, wherein determining whether to approve the first document comprises determining whether computer code provided for use in display the first and the second document has been modified.

7. The method of claim 1, wherein determining whether to approve the first document comprises verifying website ownership information associated with the first and the second document, wherein the website ownership information is received from a third party website-ownership database system.

8. The method of claim 1, wherein determining whether to approve the first document comprises determining whether a publisher of the first and the second document has permission to publish the content in the first and the second document, respectively.

9. The method of claim 1, wherein determining action whether to approve the first document comprises searching for at least one of the following in the first and the second document:
  specific text or phrases;
  scripting language that enables viewers to interact with the document, wherein the scripting language code further interacts with code related to displaying documents on a network site;
  absence of code related to a document; and
  any modification to code provided to a publisher of the document.

10. The method of claim 1, further comprising repeating the obtaining and determining actions using a set of indirectly linked documents that are within a specified number of degrees of separation from the first document.

11. The method of claim 10, wherein the first document is hosted by a particular domain, and wherein the set of indirectly linked documents are hosted by a same domain.

12. The method of claim 1, further comprising crawling website content based on information received at a user's computer.

13. The method of claim 12, wherein the obtaining comprises identifying a website accessed by a user's web browser.

14. The method of claim 12, wherein the crawling is performed by a plurality of plug-in programs at a plurality of user computers passing results of their respective determining actions to the one or more computers.

15. The method of claim 1, wherein the content includes content associated with a search engine, banner network, web content licensor, e-commerce retailer, and hosting provider.

16. The method of claim 1, further comprising compiling a list of a plurality of documents to be accessed.

17. The method of claim 1, further comprising crawling Internet content by the one or more computers.

18. The method of claim 1, wherein the first and the second document comprise target network sites accessible through the network.

19. The method of claim 1, wherein the first and the second document comprise web pages accessible through the network.

20. The method of claim 1, further comprising sending advertising content over the network based on a determination that the first document is approved.

21. The method of claim 20, wherein determining whether the content of the third document is compliant comprises determining whether the content of the third document is compliant based on a second set of compliance rules that is less restrictive than the first set of compliance rules.

* * * * *